Dec. 30, 1924.

N. H. CAUFIELD 1,521,075

STOOKER

Filed Aug. 5, 1921      6 Sheets-Sheet 1

INVENTOR
Norman Howard Caufield

Dec. 30, 1924.

N. H. CAUFIELD 1,521,075

STOOKER

Filed Aug. 3, 1921   6 Sheets-Sheet 2

INVENTOR
Norman Howard Caufield
BY
ATT'YS.

Dec. 30, 1924.

N. H. CAUFIELD 1,521,075

STOOKER

Filed Aug. 3, 1921

INVENTOR
Norman Howard Caufield

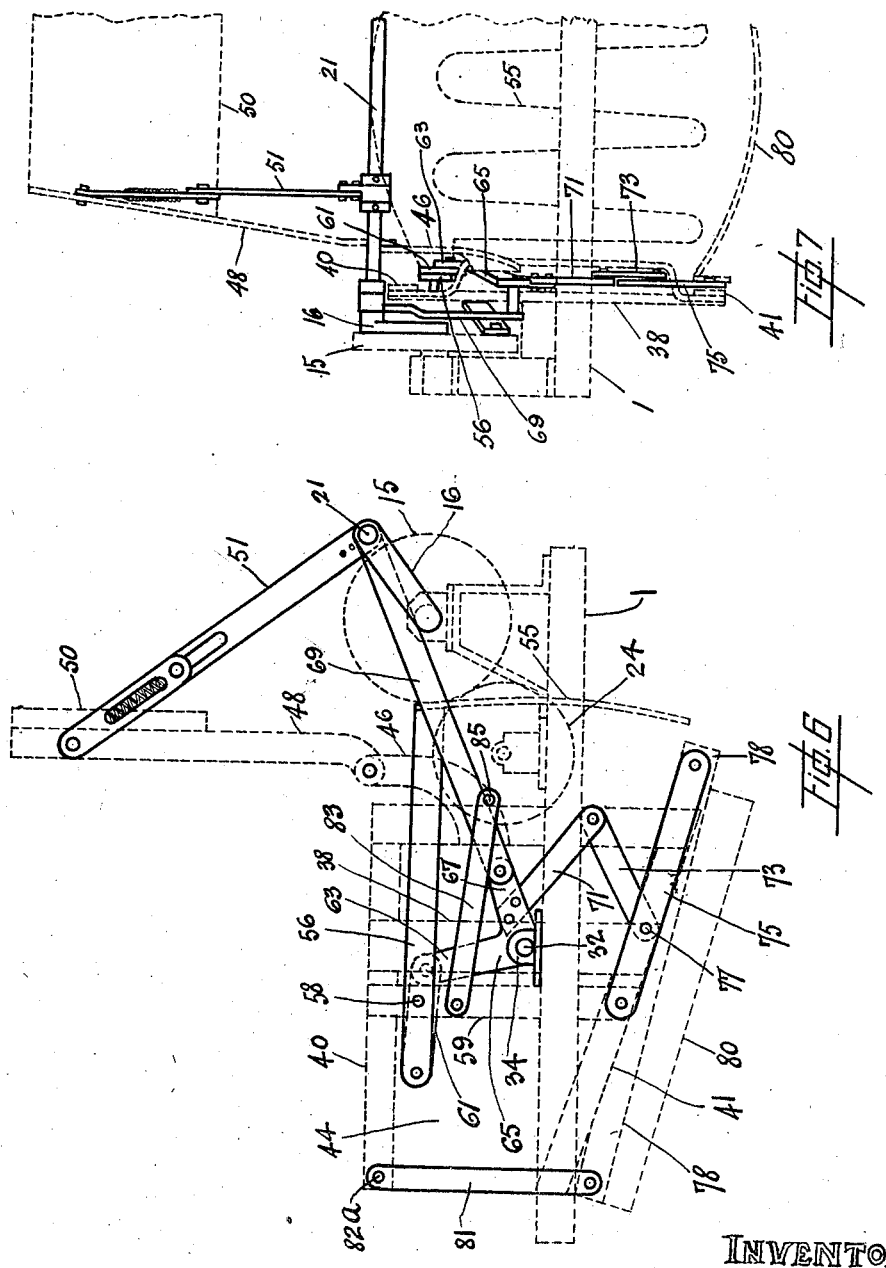

Patented Dec. 30, 1924.

1,521,075

UNITED STATES PATENT OFFICE.

NORMAN HOWARD CAUFIELD, OF VICTORIA, BRITISH COLUMBIA, CANADA.

STOOKER.

Application filed August 3, 1921. Serial No. 489,451.

*To all whom it may concern:*

Be it known that I, NORMAN HOWARD CAUFIELD, a subject of the King of Great Britain, and a resident of the city of Victoria, in the Province of British Columbia, Canada, have invented certain new and useful Improvements in Stookers, of which the following is a specification.

My invention relates to improvements in stookers, and the object of my invention is to devise a stooking machine of simple construction adapted to form into shocks the sheaves delivered to it from the binder and then dump the shocks in a vertical position in a highly efficient manner and which machine is automatic in its operation.

I attain this object by the construction illustrated in the accompanying drawings in which—

Fig. 6 is a side view illustrating the basket structure by dotted lines in the receiving position, the lever arrangement on the near side being shown by the full lines.

Fig. 7 is a view of the left hand half of the device looking on the front end of Fig. 6.

Similar figures of reference indicate similar parts throughout the several views.

Figure 1:
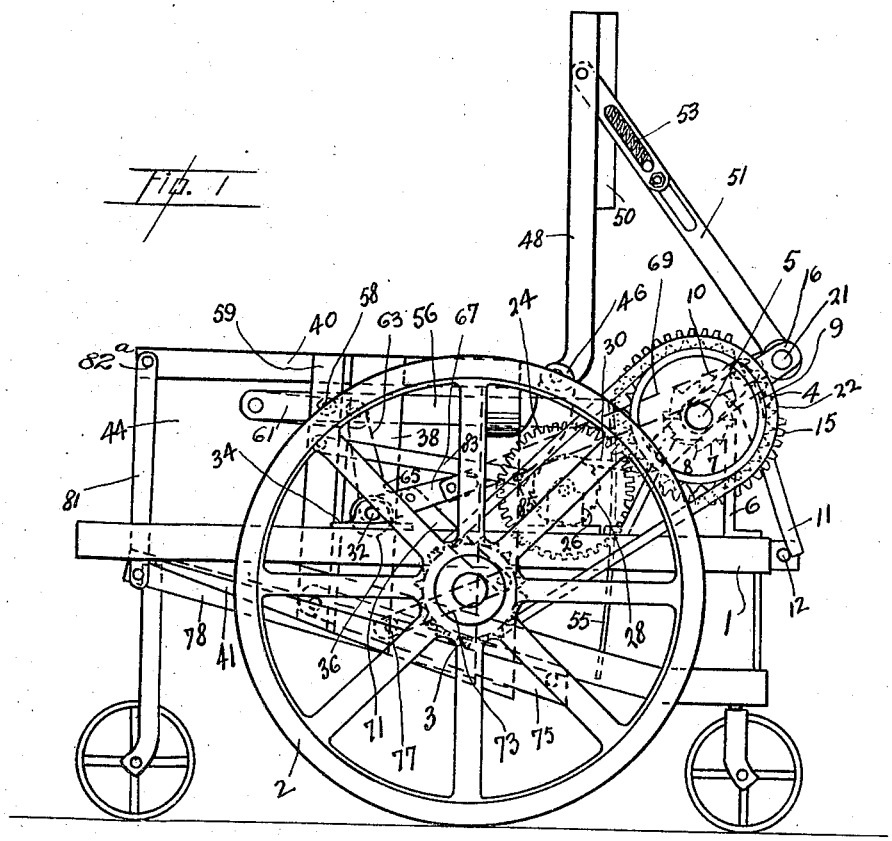
Fig. 1 is a side elevation of the stooker.

1 indicates a horizontal frame, substantially U-shaped on which the machine structure, hereinafter described, is mounted, which frame is provided on the side remote from the binder with a main traction wheel 2, the opposite side of the frame being connected to the binder by any suitable means so that it travels along with the binder when the same is in operation. Secured to the traction wheel 2 and rotatable therewith is a sprocket 3 chain-connected to a sprocket 4 rotatably mounted on a shaft 5 rotatably mounted on the traction wheel side of the frame and supported by a bearing 6 secured to the frame 1. The sprocket 4 has secured to it on its inner face a clutch 7 provided with a plurality of clutch teeth 8, preferably eight in number, with any of which teeth a spring-pressed pawl 9 pivotally connected at one end to an arm 10 secured to the shaft 5 may be engaged when required, as more fully hereinafter described, the opposite end of which pawl is extended as at 11 and normally rests on a laterally movable spring-pressed pin 12 mounted on the front end of the frame, the pawl being thereby held out of engagement with the clutch teeth 8. The pin 12 may be withdrawn laterally by the binder operator, and any suitable mechanical means may be used, such as a rod 13 and lever 14.

The shaft 5 is extended through the bearing 6 and is provided on its inner end with a gear 15 and to the inner face of the gear and on the shaft is secured a crank arm 16, a similar gear 17 and crank arm 18 being secured to a shaft 19 rotatably mounted in a bearing 20 supported on the frame on its opposite side and between the two arms 16 and 18 extends a transverse shaft 21, the ends of which are secured into the arms.

The gears 15 and 17 are not complete gears, but for a portion of their peripheral circumference they are formed without teeth, that is, plain, as indicated at 22 and 23, and they mesh with gears 24 and 25 respectively rotatably carried by suitable bearings 26 and 27 secured to the frame. these gears being provided on their outer faces respectively with a plurality of ratchet teeth 28 and 29 with which normally engage spring-pressed pawls 30 and 31, which pawls are pivotally connected to the respective bearings 6 and 20.

32 and 33 indicate stud shafts rotatably mounted in bearings 34 and 35, on which shafts are rotatably mounted sleeves 36 and 37 each of which sleeves is provided at its inner end with a bar, 38 and 39 respectively, disposed normally vertical when the device is out of operation, to the upper ends of which bars are secured the upper and lower horizontal bars 40—41 and 42—43 to which the side plates 44 and 45 of the basket are secured, these sides being arranged to lie closer together at their rear ends than at their forward ends, that is, the sides of the basket taper inwardly towards the rear end. To the front ends of the sides 44 and 45 are secured vertical arms 46 and 47 to the ends of which are pivoted the lower ends of normally vertical bars 48 and 49 between which is secured a concave plate 50 which forms the front closure plate of the basket, that is, the front when dumping, and these arms are automatically swung about their pivoted lower ends to carry the front plate to open or close the front of the basket by means of bars 51 and 52 the lower ends of which are freely mounted on the shaft 21 while their upper ends are connected to the bars 48 and 49. The bars 51 and 52 are divided intermediate their length and between the divided portions is inserted a spring, 53 and 54 respectively, so that undue pressure on the closure plate is relieved when in the act of compressing the sheaves in the basket.

When the basket is disposed in horizontal position the front or downwardly moving end is closed by a vertical plate 55, consisting of a body portion formed with a plurality of spaced tines. This plate is attached to and carried by a pair of normally horizontal side bars 56 and 57 which are pivoted, as at 58, to bars 59 and 60. The last mentioned bars extend between and are secured to the bars 40—41 and 42—43 of the basket being positioned rearwardly of the bars 38 and 39 and in parallel relation therewith. The rear ends of the bars 56 and 57 are connected by means of levers 61 and 62 to arms 63 and 64 of bell cranks 65 and 66 secured to the inner ends of the stud shafts 32 and 33 while to the opposite arms 67 and 68 of the bell cranks are connected the ends of bars 69 and 70 the opposite ends of which bars are freely mounted on the shaft 21. To the arms 67 and 68 of the bell cranks are secured arms 71 normally projecting downwardly and inclined forwardly, to which arms are connected levers 73 the opposite ends of which are connected to bars 75 at points intermediate the length of the bars, as at 77 these bars being pivotally connected at one end to the lower ends of the bars 59 and 60 while at their opposite ends they are freely connected to bars 78 between which extends a plate 80 which forms the bottom plate of the basket when horizontal but the back plate when dumping, and these bars 78 and 79 are freely connected at their opposite ends to the ends of bars 81 the opposite ends of which are freely connected to the rear ends of the upper horizontal bars 40 and 42, as indicated at 82ª in Fig. 1. It should be pointed out that the numerals 73, 75, 78, and 81, refer respectively to pairs of bars, there being one bar of each pair on the far side of the machine, corresponding to the one shown in the drawing on the near side. 83 and 84 indicate levers connected at one end to the bars 59 and 60 while at their opposite ends they are connected to pins 85 and 86 secured out of centre to the gears 24 and 25.

Figure 2:
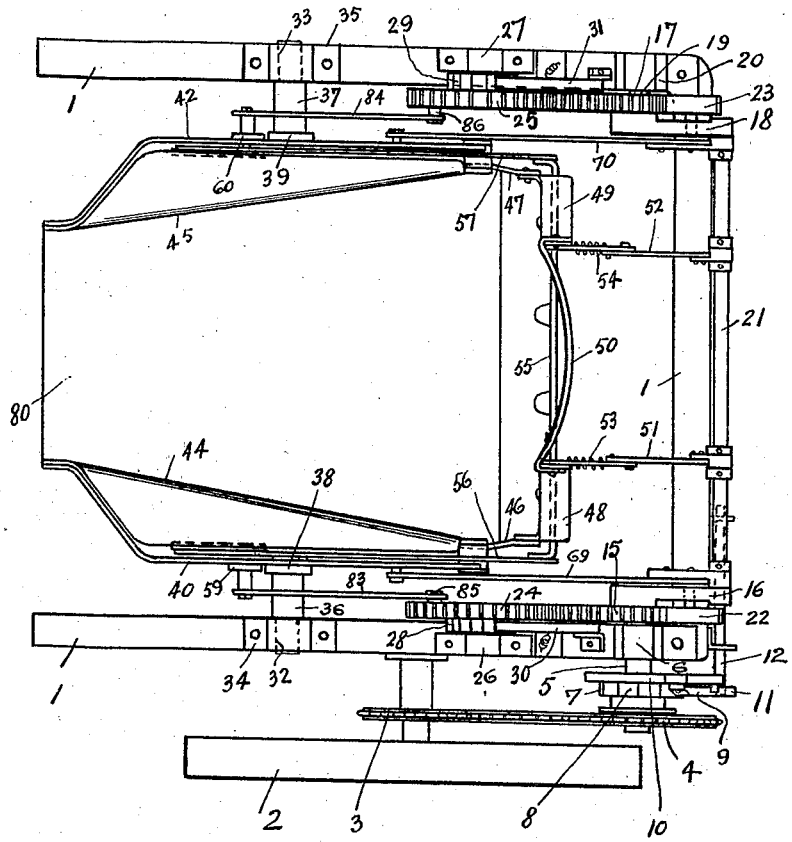
Fig. 2 is a plan view.
Figure 3:
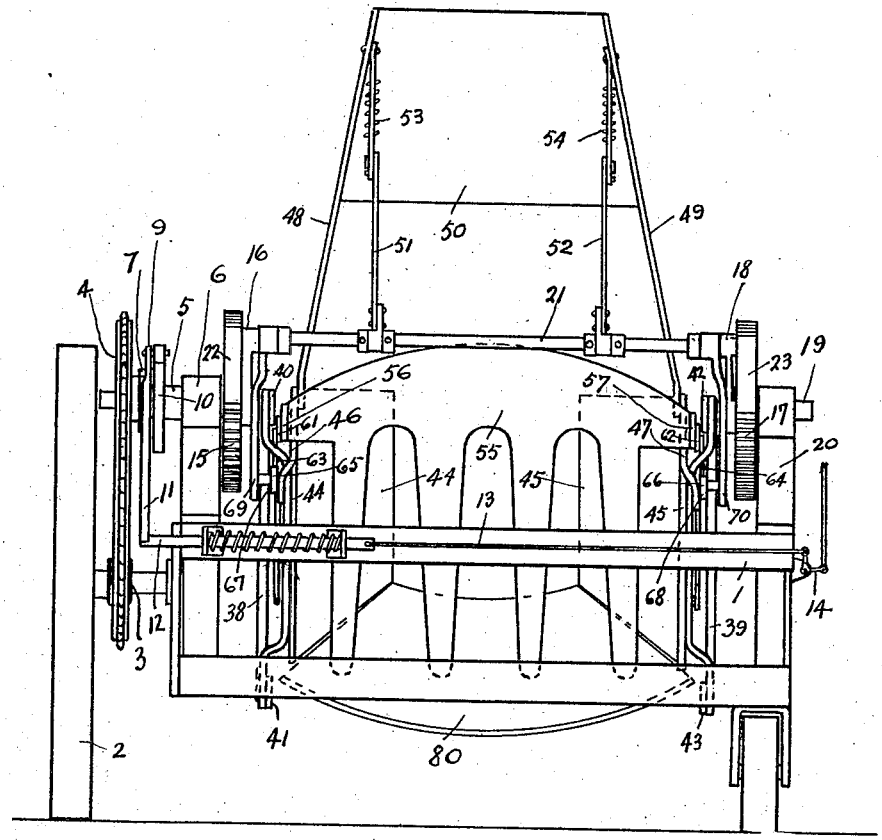
Fig. 3 is an end view.
Figure 4:
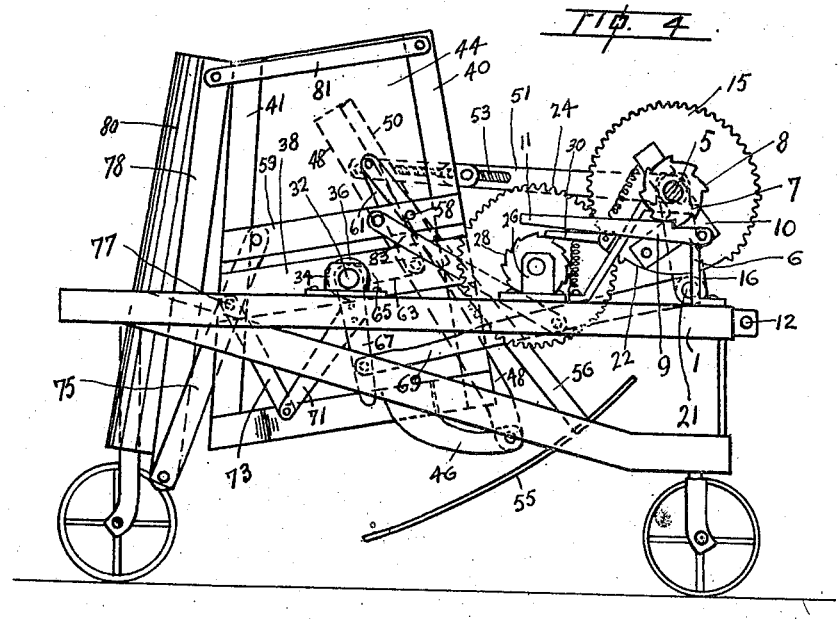
Fig. 4 is a side elevation of the basket just before dumping.
Figure 5:
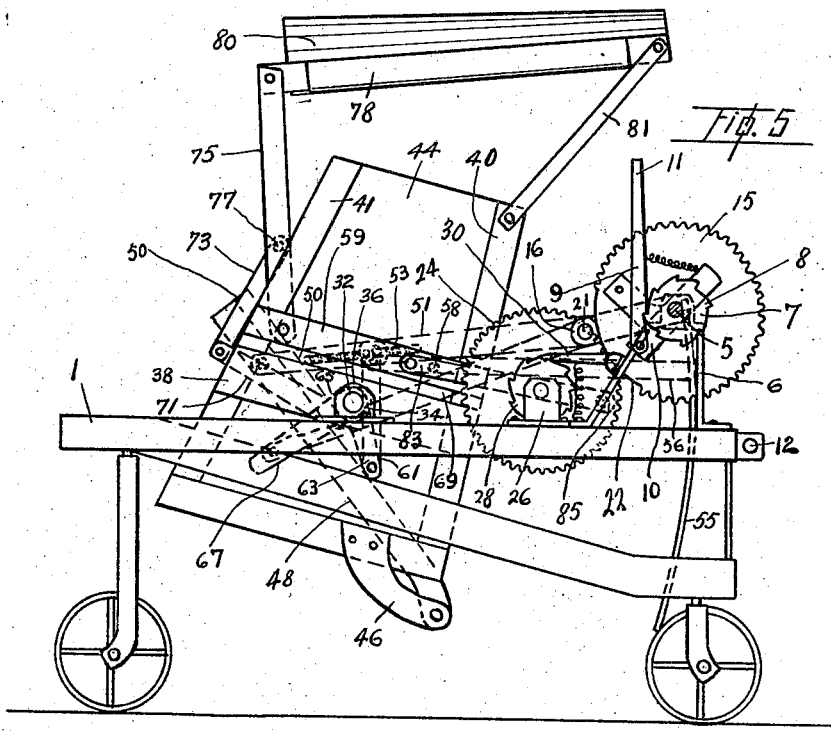
Fig. 5 is a side elevation of the basket just before returning to normal position.
Figure 8:
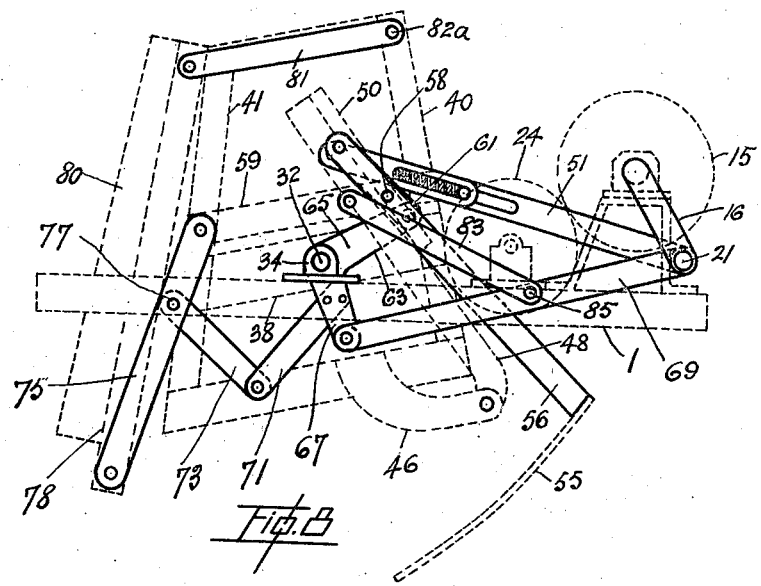
Fig. 8 is a side view similar to Fig. 6 showing the basket and lever positions just before dumping.
Figure 9:
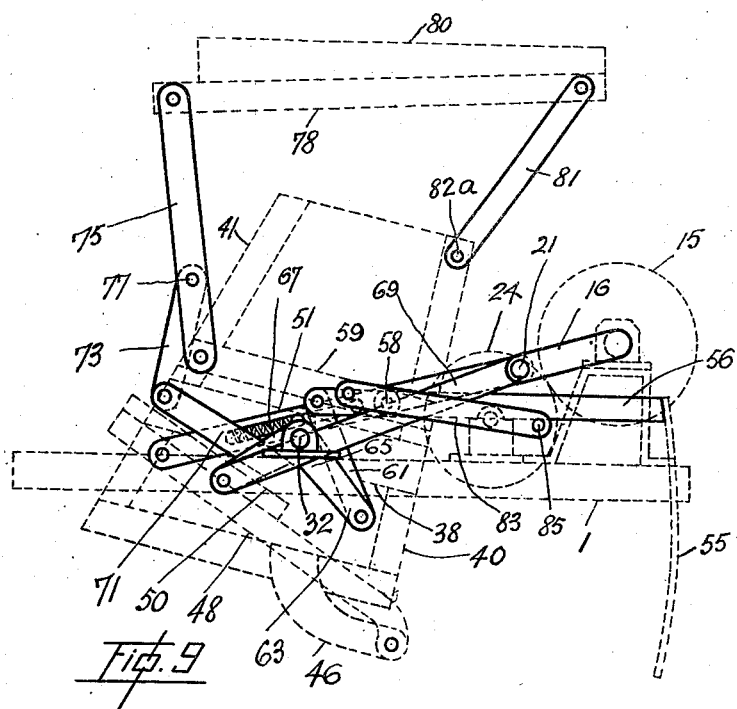
Fig. 9 is a view similar to Fig. 8 illustrating the basket and lever positions just before returning to the normal position.

The manner in which the machine operates may be briefly described as follows:— In Figs. 1, 2 and 3 the basket is shown in the open position, the front closure plate 50 being raised and the basket operating mechanism being out of operation, the traction wheel 2 and its axle, however, rotating as the stooker is carried along with the binder so that the sprocket 4 is also rotating freely on the shaft 5. As soon as a sufficient number of sheaves have been deposited in the basket the operator actuates the rod and lever mechanism 13 and 14, thus withdrawing the pin 12 clear of the end 11 of pawl 9 whereupon the pawl drops into one of the clutch teeth 8 of the clutch 7 and as the pawl is secured to the arm 10 which is secured to shaft 5, this shaft is thus set in motion, carrying round the crank arms 16 and 18 and rotating the gears 15—24 and 17—25, the basket swinging of its own weight on the stud shafts 32 and 33 until it reaches a substantially vertical position, being assisted by the rearward movement of the bars 69 and 70 which swing the bell cranks 65 and 66 on the stud shafts, and in this position the front closure plate 50 is disposed between the side plates 44 and 45 a sufficient distance to compress the sheaves into a compact stook, undue strain on the front plate and its bars 48 and 49 being averted, however, by the provision of the springs 53 and 54. The basket being substantially vertical and loaded the gears 15—24 and 17—25 continue to rotate carrying with them the crank arms 16 and 18 so that the basket continues to swing until it assumes a slightly forwardly inclined position, as indicated in Fig. 5, the bell cranks also being swung on the shafts to spread the bar and lever mechanism associated with the bottom plate 55 and back plate 80 to swing the bottom plate clear of the basket and deposit the stook on the ground, the back plate being raised, both these positions being as indicated in dotted lines in Fig. 5, while the front closure plate is carried through between the sides of the basket to the full limit of the length of the bars 48 and 49, which are then practically horizontal. At this point the gears 24 and 25 are rendered inoperative due to the plain portions 22 and 23 of the gears 15 and 17 so that the basket is held against further movement by the levers 85 and 86 but the bar and lever mechanism continues to be spread by the continued rotation of gears 15 and 17, raising the back and bottom plates 80 and 55 into the positions shown in Fig. 5. The crank arms 16 and 18 are now past the horizontal centre on their upward travel so that a reverse movement of the bell cranks 65 and 66 takes place, reversing the operation of the bar and lever mechanism and causing the back and bottom plates to fall back into their normal position and at the same time the gears 15 and 17 mesh again with gears 24 and 25 causing them to again rotate and, through levers 83 and 84, swing the basket from the vertical to its normal horizontal position, the front plate being simultaneously swung upwardly into its normal open position by the bars 51 and 52, and at the termination of each complete revolution, as just described, the pawl 9 strikes the pin 12 and is raised out of engagement with the clutch 7, so that the operation of the basket and its associated mechanism is automatically stopped until the basket is again filled with sheaves.

From the foregoing description it will be seen that I have devised a stooking machine which is extremely simple in construction and operation and which is capable of forming and depositing the stooks so that they will remain vertical in a highly efficient manner.

What I claim as my invention is:—

1. In a stooker, the provision of a pair of oscillatable stub shafts, normally horizontal side plates carried thereby and swingable from horizontal to approximately vertical position, a bottom plate, links connecting one end of the bottom plate to the upper rear corners of the horizontal side plates, additional links connecting the remaining end of the bottom plate to the lower edge portions of the side plates intermediate the length of the latter, a pair of bell cranks mounted on the stub shafts, jointed connections extending between the last-mentioned links and certain arms of the bell cranks, a crank shaft, operating connections extending between the crank shaft and the aforementioned arms of the bell cranks, a pair of bars pivoted at an intermediate point to the aforementioned side plates, connections extending between the inner ends of the bars and the remaining arms of the bell cranks, an end plate carried by the remaining ends of said bars, a top plate pivoted to the side plates at or near the upper forward corners of the latter, means connecting the top plate to the crank shaft to be operated thereby and normally maintaining the top plate in upright or open position, a pair of oscillatable members geared to the crank shaft to be driven thereby, crank pins carried by said members and links connected between said pins and the side plates.

2. In a stooker, the combination of a normally horizontal sheaf receiving basket including a pair of side plates, stub shafts oscillatably mounting said plates to permit the same to swing from horizontal to approximately vertical position, displaceable bottom and end plates connected to the side plates, bell cranks rigidly carried by said stub shafts, means connected to the bell cranks for effecting movement of the side plates to approximately vertical position and means connecting the bottom and end plates to the bell cranks and controlling displacement of said plates.

3. In a stooker, a normally horizontal sheaf receiving basket comprising a pair of side plates oscillatably mounted to swing from horizontal to approximately vertical position, displaceable bottom and end plates connected to said side plates, a crank shaft, and means driven from the crank shaft for controlling movement of the side plates and the displacement of the bottom and end plates.

4. The combination with the structure recited in claim 3 of a normally upright top plate pivoted to the aforementioned side plates and means operable by the crank shaft for moving the top plate from upright position to a shock compressing position between the side plates.

5. In a stooker, a normally horizontal sheaf receiving basket comprising a pair of side plates oscillatably mounted to swing from horizontal to approximately vertical position, a bottom plate, links connecting the bottom plate to the side plates to permit displacement of the bottom plate and means for controlling the movement of the side plates to vertical position and the displacement of the bottom plate with respect to the said side plates.

6. In a stooker, a normally horizontal sheaf receiving basket comprising a pair of side plates oscillatably mounted to swing from horizontal to approximately vertical position, and end plate closing the forward end of the basket when the side plates are disposed horizontally, means pivotally connecting the end plate to the side plates to permit displacement of the end plate when the side plates are oscillated to vertical position, and means controlling the movement of the side plates and the displacement of the end plate.

7. A stooker comprising a frame, a traction wheel supporting the frame, a normally horizontal sheaf receiving basket comprising side plates, stub shafts journalled in the frame and oscillatably supporting the side plates to permit the same to swing from horizontal to approximately vertical position, a crank shaft driven from the traction wheel, a counter-shaft geared to the crank shaft, pinions carried by the countershaft, crank pins carried by the pinions, connecting links extending between the side plates and said pins, displaceable bottom and end plates pivotally connected to the side plates, mechanism for controlling displacement of said bottom and end plates including bell cranks fixed to the aforementioned stub shaft operating connections extending between certain arms of the bell cranks and the aforementioned crank shaft, a normally upright top plate having pivotal connection with the said side plates, and an operating connection extending between the said top plate and the aforementioned crank shaft.

Dated at Victoria, B. C., this 16th day of July, 1921.

NORMAN HOWARD CAUFIELD.